United States Patent Office 3,432,307
Patented Mar. 11, 1969

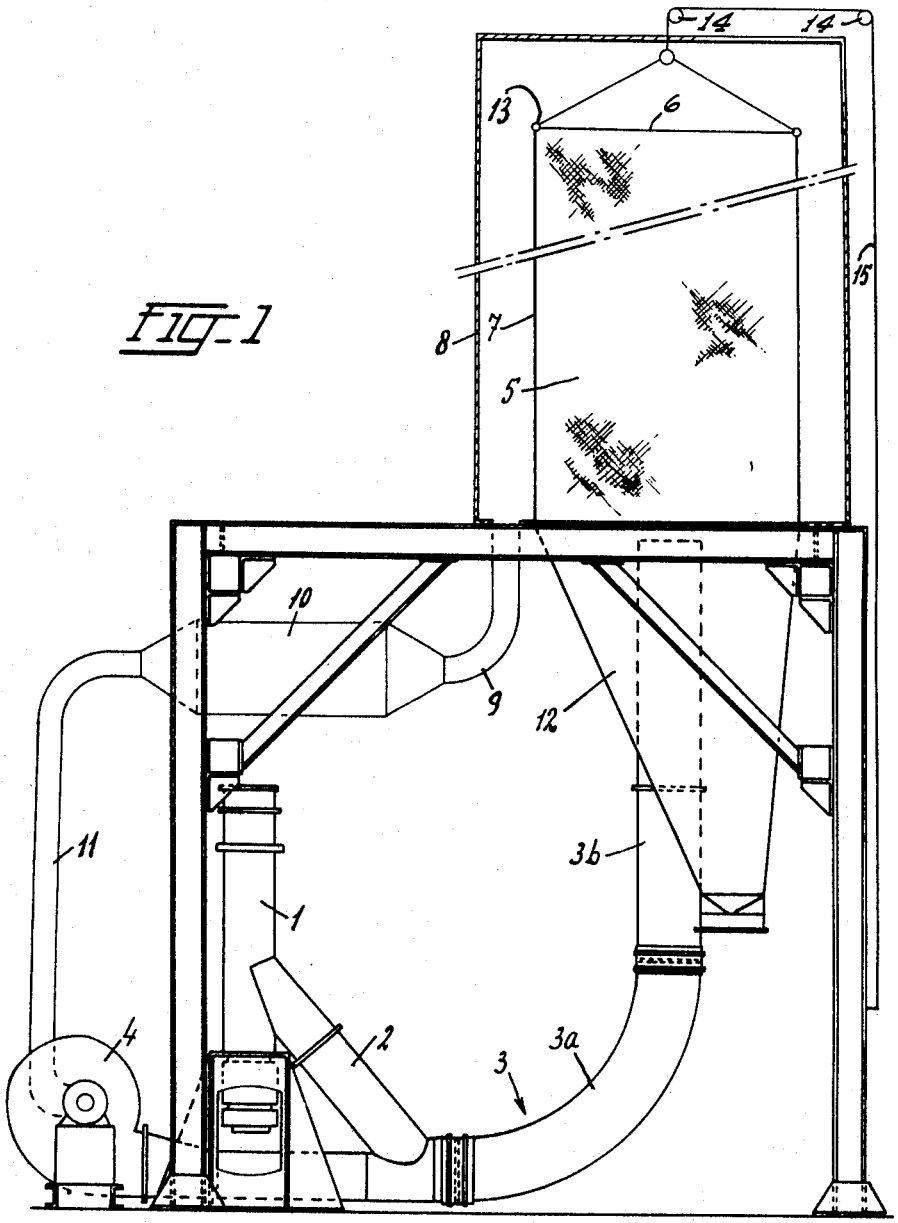

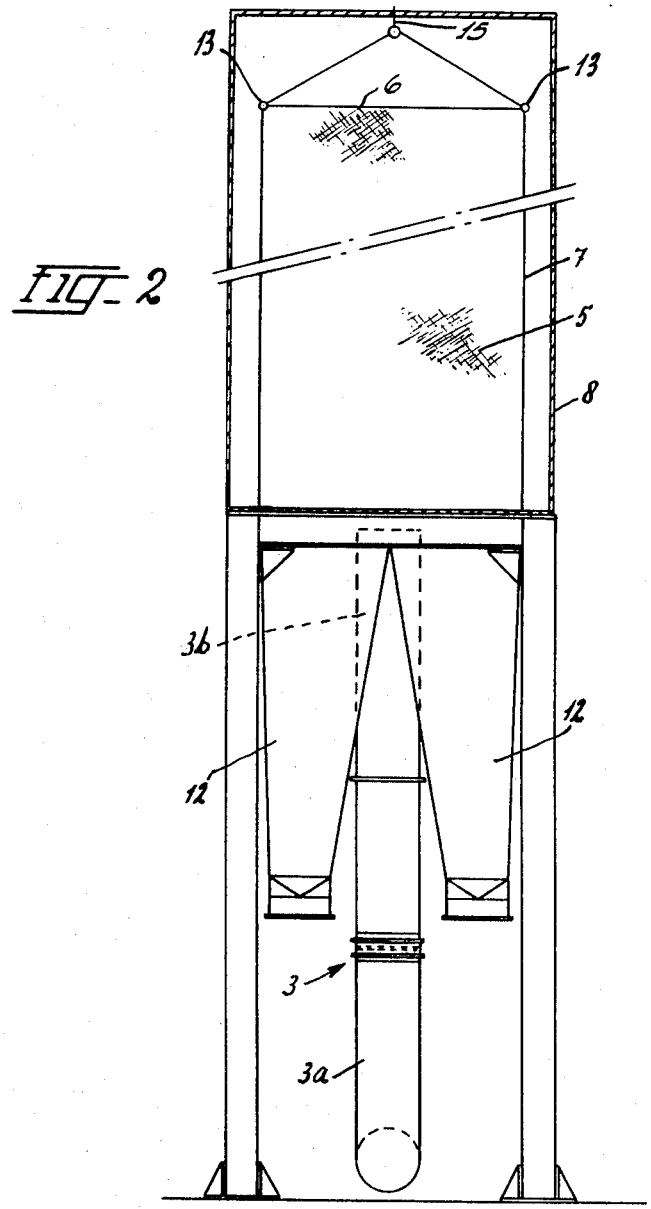

3,432,307
METHOD AND APPARATUS FOR PREPARING A MIXED PRODUCT
Christiaan Marie van Ginneken, Jacob Obrichtlaan 14, Bussum, Netherlands, and Adriaan Johannes Josephus van Ginneken, Nederhoven 39, Amsterdam-Buitenveldert, Netherlands
Filed June 15, 1965, Ser. No. 464,170
Claims priority, application Netherlands, June 17, 1964, 6406910; Sept. 11, 1964, 6410588
U.S. Cl. 99—56    5 Claims
Int. Cl. A23c 9/00, 11/00, 3/00

ABSTRACT OF THE DISCLOSURE

A method and apparatus for preparing artificial calf milk in which a powdery material and melted fat is introduced into a mixer and thereafter transported by cool air in a conduit to a chamber, wherein the viscous liquid is substantially completely solidified. The mixture is discharged upwardly into the chamber and the mixture travels along a free unimpeded path, the solids being collected at the bottom of the chamber while the cooling air is recirculated in a closed circuit.

---

The invention relates both to a method for preparing a mixed product, in particular concentrated artificial calf milk, wherein a powdery matter and a viscous liquid, such as melted fat, are mixed in a mixer; and to an apparatus wherein this method may be carried out.

Calves are often separated from the mother cows soon after their birth and are then fed with a foodstuff which may replace the cows' milk. This foodstuff consists of a quantity of dry matter, which is dissolved in water immediately before use and then forms an artificial calf milk.

The said dry matter viz the concentrated artificial calf milk is a mixture of fat and powdery substances, which mainly consist of skimmed milk powder, the fat content of the mixture generally being 22% or less.

In the production of concentrated artificial calf milk the addition of the fat is generally the last step. At first, a mixture of all powdery substances is formed, whereafter a mixture of various kinds of fat and an emulsifying agent in melted condition is added to these powdery substances and the entire mass is intensively mixed in a mixer. The homogeneous material leaving the mixer then has the composition required for the concentrated artificial calf milk.

However, the fat in this material is still wholly or at least mainly in melted condition, so that the material, if stored at temperatures at which the fat will solidify, will become extremely hard and therefore unsuitable for immediate use.

As the temperature range at which the fat solidifies is hardly ever lower than approximately 25° C., this hardening of the material occurs during the greater part of the year, at least in the United States, where the storage temperature is generally lower than 25° C., particularly during the night.

Therefore, up to the present, the material discharged from the mixer is stored by the manufacturer over such a period in which it is thoroughly hardened. This storage period generally amounts to 10 days at least, although storage periods of 2 to 3 weeks often occur. After this storage period, the material, which is thoroughly hardened, is crushed and ground, whereafter it is ready for delivery.

The above storage period is very inconvenient for the manufacturer, and the crushing and grinding operations take much time and are costly.

It is a first object of the present invention to provide a method for preparing a mixed product, in particular concentrated artificial calf milk, wherein the above storage period as well as the crushing and grinding operations are rendered unnecessary and may be dispensed with.

It is a further object of the present invention to provide a method for preparing a mixed product, in particular concentrated artificial calf milk, which may be carried out in a relatively small space.

It is a still further object of the present invention to provide an improved apparatus for preparing a mixed product, in particular, concentrated artificial calf milk.

According to the invention the method is characterized in that the material discharged from the mixer is introduced into a flow of cooling air, which transports the material through a conduit, whereafter the material follows a free path and is finally collected in a stable powdery condition wherein the liquid is substantially solidified.

Surprisingly it has been found that, by intensively cooling the material by air immediately after it has left the mixer, until the viscous liquid has been wholly or at least mainly solidified, a powdery mixed product is obtained, which is immediately ready for use and which does not even harden when it is packed in bags and exposed to pressure for prolonged storage periods at a low temperature.

It is preferred that the flow of cooling air blows the material out of the conduit vertically upwards in the manner of a water fountain, whereafter the material follows a downward path before being collected.

The improved apparatus for preparing a mixed product, in particular concentrated artificial calf milk, according to the above method, comprises a mixer provided with means for supplying a powdery matter, means for supplying a viscous liquid such as melted fat, and means for discharging the mixed material. According to the invention, this apparatus is characterized in that cooling air is supplied by a compressor to a conduit connected to the discharge means of the mixer, and that the material, after having left the conduit, is discharged upwardly and allowed to follow a path of free fall and reach a collecting means. The conduit may comprise a vertical end portion.

In a preferred embodiment of the apparatus, the conduit opens centrally into a separating chamber at the lower end thereof, said separating chamber having side walls and a top wall made of filter cloth and being connected at its lower end to said collecting means.

It has been found that an excellent mixed product is obtained if a mixer is used as described in U.S. Patent 2,887,305. The material discharged from this mixer is composed of very small particles having a size of 100–500 microns, so that a very large contacting surface between the material and the cooling air is provided.

The invention will now be further described with reference to the drawing, which shows an apparatus according to the invention by way of example, and wherein:

FIG. 1 is a front view of an apparatus according to the invention for preparing a mixed product, in particular concentrated artificial calf milk, and FIG. 2 is a side view of the apparatus according to FIG. 1.

In the drawing, a vertical mixer 1 is shown, which is preferably constructed in the manner as described in U.S. Patent 2,887,305. Melted fat is fed in fine jets into the upper end of the mixing chamber of this mixer 1. Powdery matter mainly consisting of skimmed milk powder is fed into the same end of the mixing chamber through a lock. Immediately below the supply of the liquid fat, the powdery matter is subjected to a strong rotating movement, perpendicular to the vertical direction of flow of the liquid fat by means of successive assemblies of rapidly rotating knives. At least a part of the knives act as vanes and produce an upward air current in the mixing chamber, whereby the particles of the powdery material are kept in suspension. The resulting mixed mass moves along a helical path in downward direction and is intersected by successive assemblies of rapidly rotating knives.

The material, which is discharged from the mixer 1 through the discharge conduit 2, consists of small particles, which are partly composed of a core of fat surrounded by powdery matter. In general these particles have a size of 100–500 microns.

The discharge conduit 2 empties into a conduit 3, which is connected to the delivery side of a compressor 4, supplying cooled air to the conduit 3. This air cools the material and transports it through the bend 3a to the vertical conduit portion 3b.

This vertical conduit portion 3b opens centrally into a vertical separating chamber 5 at the lower side thereof. The top wall 6 and the side walls 7 of this separating chamber 5 are made of filter cloth with a mesh size of 50 microns at a maximum. The filter cloth is preferably made of smooth artificial fibres such as nylon fibres and remains sufficiently pervious to air for a long time, as the cooler material is no longer greasy.

The material is discharged from the conduit 3b in the form of a fountain of small particles which, after attaining their highest level, freely fall in a rain-like manner. In this way, the particles cover a very long path, during which they are exposed to the cooling action of the air.

The air, which is supplied to the operating chamber 5 via the conduit 3, is discharged from this separating chamber 5 through the top wall 6 and the side walls 7 of filter cloth, and reaches a closed casing 8, enveloping the separating chamber 5. A conduit 9 connects this casing 8 to a cooler 10, wherein the air, which is heated during its contact with the particles, is again cooled to the desired starting temperature. The cooled air flows from the cooler 10 through the conduit 11 to the suction side of the compressor 4, so that a closed circuit for the air is obtained.

The mixed product, which is cooled to such extent that the fat is substantially solidified, falls from the separating chamber 5 into the discharge hoppers 12 and is then packed in bags.

As the air is circulated in a closed circuit, atmospheric pressure prevails in the hoppers 12, so that the material leaves the hoppers 12 at their lower end without any escape of air. The packing of the material in bags is considerably simplified thereby.

In addition, the advantage is obtained that the circulating cooling air soon becomes very dry, as the liquid present therein is frozen out or is removed by the hygroscopic characteristics of the powdery matter. This will improve the quality of the mixed product; moreover, the cooler 10 operates without any substantial ice-forming and therefore at a maximum efficiency. As the same air continuously circulates, the cooler 10 does not have to supply any heat for condensing additional humidity, so that a relatively small cooler 10 may be used.

The side walls 7 of the separating chamber 5, which are made of filter cloth, are attached exclusively along their upper edges 13 so as to depend freely. Therefore, these side walls 7 have a great mobility and remain in continuous motion due to the air flow. In this manner, the filter cloth is automatically cleaned; the cleaning action may be promoted periodically by vibrating the top wall 6 and the side walls 7 of the separating chamber 5 by means of a cable 15, passed over pulleys 14.

The height of the separating chamber 5 has to be determined in such manner that the material moving upwardly in this separating chamber 5 does not come into contact with the top wall 6 or only hits the same at a low velocity. In this manner, the particles are prevented from agglomerating. It has been found that the height of the separating chamber 5 should be at least 2½ meters when the material leaves the conduit 3 with a velocity of approximately 15 meters/sec. In practice, the height of the separating chamber is approximately 6 meters.

The cooling air entering the conduit 3 has to be at such a temperature that the fat in the material is at least mainly solidified when reaching the hoppers 12. The maximum starting temperature of the cooling air depends on the temperatures of the dry matter and the fat, on the mixing ratio of these components, on the solidification point or the solidification range of the fat and on the ratio between the weight of the cooling air and the weight of the material to be cooled per unit of time.

EXAMPLE

Solid matter (mainly skimmed milk powder) of 15° C. and melted fat of 45° C. were mixed in a mixer constructed according to U.S. Patent 2,887,305. The mixture was fed to a conduit analogous to the conduit 3 in FIGURE 1, and therefrom into a separating chamber at the lower side thereof. The side walls and the top wall of this separating chamber consisted of filter cloth made of nylon fibres. Two hoppers were connected to the lower side of the separating chamber. For the cooling operation, 115 kg. of cooling air at a temperature of 2° C. were fed to the above conduit for each 50 kg. of the mixture. The mixed product entering the hoppers had a temperature of 17° C. and did not contain any agglomerates. Thereafter, the mixed product was packed in bags and was stored at an average temperature of 8° C. and at a pressure of approximately 0.8 kg./cm.$^2$ by piling up a plurality of bags. After 10 days, the mixed product was still absolutely smooth and free of any agglomerates.

The invention is not limited to the embodiment shown in the drawings, which may be varied in several ways within the scope of the invention.

We claim:

1. Apparatus for preparing a mixed food product comprising a mixer; means for supplying a powdered foodstuff to said mixer; means for supplying a viscous melted fat to said mixer; discharge means for discharging a mixture of said foodstuff and fat from said mixer, a conduit having one end connected to said discharge means and including a vertical end portion at its other end; a compressor having a delivery side connected to said one end of said conduit; air cooler means connected to said compressor at the suction side thereof; a separating chamber having a lower end into which said vertical end portion of the conduit opens, said chamber including side walls and a top wall constituted of filter cloth, said chamber having a height such that the mixture of material is discharged upwardly thereinto from said conduit to undergo substantially free unimpeded travel in the chamber in the current of cooled air whereby the viscous fat solidifies; a solid casing enclosing said separating chamber; a duct connecting said casing to said air cooler means whereby the cooled air recirculates along a closed circuit; and collecting means connected to said chamber at the lower end thereof for removal of the mixture in which the viscous fat is solidified.

2. Apparatus as claimed in claim 1 comprising a frame supported in said casing, said side walls and top wall of the chamber being supported from the frame such that the side walls freely depend from the frame.

3. Apparatus as claimed in claim 2 comprising vibrating means coupled to the frame for vibrating said chamber.

4. A method for preparing a mixed food product comprising mixing a powdered foodstuff and viscous melted fat, transporting the thus obtained mixture in a flow of cooling air to cause solidification of the fat, upwardly discharging the mixture into a chamber wherein said flow of cooling air blows the mixture vertically upwards in said chamber in the manner of a substantially unobstructed fountain whereafter the mixture follows a downward path, collecting the mixture of powdered foodstuff and solidified fat at the lower end of the chamber and conveying the air from the chamber.

5. A method as claimed in claim 4 wherein the cooling air from the chamber is circulated in a closed circuit.

References Cited

UNITED STATES PATENTS

| 1,110,344 | 9/1914 | Preston | 55—305 X |
| 1,513,622 | 10/1924 | Manning. | |
| 1,571,518 | 2/1926 | Foster. | |
| 2,057,578 | 10/1936 | Kleissler | 55—305 |
| 2,574,848 | 11/1951 | Schroeder. | |
| 2,887,305 | 5/1959 | Ginneken | 259—24 |
| 3,048,930 | 8/1962 | Holzrichter et al. | 34—10 |
| 3,080,235 | 3/1963 | Hodson et al. | 99—63 |
| 3,142,569 | 7/1964 | Scheidegger | 96—63 X |

FOREIGN PATENTS 503,212  5/1954  Canada.

TIM R. MILES, *Primary Examiner.*

U.S. Cl. X.R.

34—57; 99—63, 235; 259—151